Figure 1:
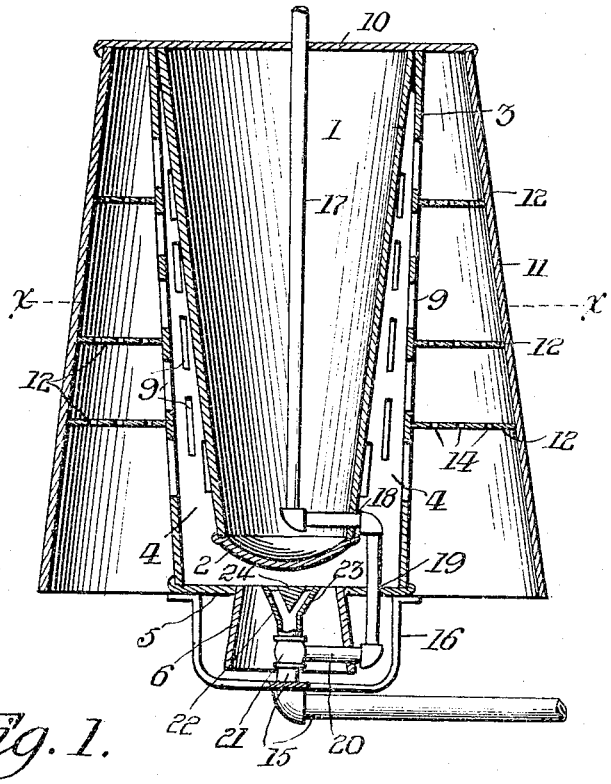

No. 792,325. PATENTED JUNE 13, 1905.
J. FINK.
HEATER.
APPLICATION FILED SEPT. 27, 1904.

Witnesses:
K. H. Butler
E. E. Potter

Inventor
Julius Fink,
By N. C. Ever & Co.
Attorneys

No. 792,325. Patented June 13, 1905.

UNITED STATES PATENT OFFICE.

JULIUS FINK, OF PITTSBURG, PENNSYLVANIA.

HEATER.

SPECIFICATION forming part of Letters Patent No. 792,325, dated June 13, 1905.

Application filed September 27, 1904. Serial No. 226,217.

*To all whom it may concern:*

Be it known that I, JULIUS FINK, a citizen of the United States of America, residing at Pittsburg, in the county of Allegheny and State of Pennsylvania, have invented certain new and useful Improvements in Heaters, of which the following is a specification, reference being had therein to the accompanying drawings.

This invention has relation to certain new and useful improvements in heaters, and more particularly to that class which are used upon gas-jets, chandeliers, and the like for heating compartments.

My invention has for its primary object the provision of a novel form of heater which may be readily secured upon a gas-jet, the construction being such as to provide a thorough combustion of the gas and radiate the same to such an extent that considerable heat will be derived from said heater when placed in operation.

Another object of this invention is to provide a heater of a convenient form, compact and extremely simple in construction, whereby the cost of manufacture will be reduced to a minimum, yet maintaining a strong and durable construction.

Briefly described, my improved heater comprises a plurality of casings of substantially a frustrated-cone shape, and in these casings are arranged a plurality of partitions which will permit the gas to radiate within the burner and thoroughly heat one or more of said casings. When constructing my improved burner, I have endeavored to so arrange the different casings and partitions that the burner as a whole will form a compact and a neat burner which will facilitate the use of the same in compartments, rooms, and the like wherein a gas-jet or chandelier is convenient.

The above construction will be hereinafter more fully described and then specifically pointed out in the claims, and referring to the drawings accompanying this application like numerals of reference designate corresponding parts throughout the several views, in which—

Figures 2, 3:
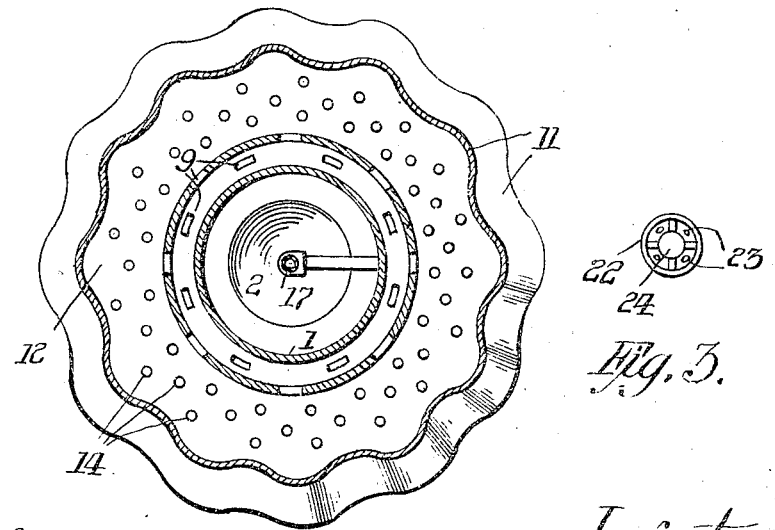

Figure 1 is a vertical sectional view of my improved heater, showing the same as connected to a gas-jet. Fig. 2 is a transverse sectional view taken on the line $xx$ of Fig. 1, and Fig. 3 is a top plan view of the gas-inlet.

In the accompanying drawings I have illustrated the preferred manner of constructing my improved gas-burner, and the same is illustrated as being connected to a gas-jet.

To put my invention into practice, I intend to construct my improved heater in such a form that it may be readily placed upon a gas-jet or chandelier, and the heater as constructed by me and illustrated in the drawings accompanying this application is particularly adapted for use upon gas-jets where the nipple has been removed from said jet.

The heater comprises a plurality of casings which are of substantially frustrated-cone shape, and the central or innermost casing is designated by the reference-numeral 1. This casing is of an inverted-cone shape and upon its frustrated end is provided with a concave plate 2. The upper exterior edges of the casing are secured by any desired means to another casing 3, which is of a similar shape, but tapers to a larger diameter than the casing 1, which construction provides an annular compartment 4. The casing 3 is of a greater depth than the casing 1 and is provided upon its lower end with a plate 5, which is provided with a central opening 7, and in this opening is secured a funnel 6, the large end of which extends downwardly and is adapted to convey air to the compartment 4. The casing 3 is provided with a plurality of openings 9, which are preferably oblong and are staggeredly arranged around said casing.

The casings 1 and 3 are provided upon their upper ends with a plate 10, this plate being of a greater diameter than the upper end of the casings, and it supports an annular casing 11, which is of a depth equal to the casing 3. Also supported from the plate 10 are a plurality of partitions 12 12 12, these partitions being perforated, as indicated at 14. The outer casing 11, besides being of a frustrated-cone shape, is corrugated, as clearly illustrated in Fig. 2 of the drawings, and in order that the partitions 12 may be supported within this outer casing or shell the edges of said partitions are similarly corrugated to snugly fit the corrugations of the outer casing. By so forming the outer shell the radiation of the heat-waves will be considerably aided and a greater area of heating-surface obtained than if the outer casing 11 was of an entire smooth surface.

I have constructed my improved burner whereby the same may be readily used in connection with a chandelier or a gas-jet, and in the casing of the burner I have provided means for connecting the same to a chandelier, this means being permanent and is adapted to remain in the burner when the same is used upon a gas-jet. By referring to Fig. 1 it will be seen that I have applied the burner to a gas-jet 15, and in order to support the burner upon the gas-jet I have provided the four-pronged bracket 16, one of said prongs being shown in cross-section, while the diametrically opposite disposed prong is invisible, owing to the position of the funnel 6. In constructing the burner I provide the same with a central pipe 17, which extends downwardly in the casing 1 and outwardly through the lower end of the casing, as indicated at 18. The pipe extends down through the plate 5, as indicated at 19, and is connected by a pipe 20 to an elbow-pipe 21. These pipes are permanently arranged within the burner, and when it is desired to use the same upon a chandelier the upper end of the pipe 17 is connected to said chandelier, and when it is desired to use it upon a gas-jet a plug (not shown) is placed in the end of the pipe 17 and the elbow-pipe 21 is connected to the gas-jet 15. The elbow-pipe is provided with a small section of pipe which is flared, as indicated at 22, said flared end being provided with apertures 23, and in the end of this pipe is placed a spider 24, this spider, as illustrated in Fig. 1 of the drawings, being of substantially an inverted-cone shape. When the gas is admitted to the burner, it is deflected by the spider 24, whereby it will strike the sides of the flared pipe 22 and be deflected outwardly into the compartment 4. I have provided the funnel 6, whereby air will be permitted to enter the compartment 4 and also the apertures 23 23 of the flared pipe 22 and will commingle with the gas, providing a thorough combustion and reducing the quantity of the gas that would be used were not air mixed with said gas. When the burner is used in connection with a chandalier, a plug is placed in the end of the elbow-pipe 21, whereby the gas will be conveyed through the pipe 17 direct to the flared pipe 22. The compartment forms a combustion-chamber, and the inner casing will be thoroughly heated, the heat or flames of gas passing through the openings 9 of the casing 3 and radiating through the perforated partitions 12, heating the upper casing, from where the heat passes into the compartment or room in which the heater is located.

What I claim, and desire to secure by Letters Patent, is—

1. In a heater of the type described, an exterior corrugated casing or shell, an interior casing or shell provided with openings, a plurality of perforated partitions arranged within the space between the exterior and interior casings or shells, a second inner casing having closed ends, a plate on the lower end of the first-mentioned inner casing and having a central opening, a funnel fitted in said opening, and a gas-supply leading into said funnel.

2. In a heater of the type described, the combination with a gas-supply pipe, of an inner and an outer casing, the inner casing provided with openings, perforated partitions arranged within the space between the inner and outer casings, a second inner casing having closed ends, a plate on the lower end of the first-mentioned inner casing, a funnel fitted in said plate and into which the gas-supply pipe extends, and means for supporting the heater on the gas-supply pipe, substantially as described.

In testimony whereof I affix my signature in the presence of two witnesses.

JULIUS FINK.

Witnesses:
Wm. C. Heitz,
K. H. Butler.